US010479251B2

(12) United States Patent
Hur et al.

(10) Patent No.: US 10,479,251 B2
(45) Date of Patent: Nov. 19, 2019

(54) LEG-REST FOR VEHICLE (71) Applicant: DAE WON SAN UP CO., LTD, Ansan-si, Gyeonggi-do (KR)

(72) Inventors: Sun-Ho Hur, Seoul (KR); Young-Cheol Jang, Ansan-si (KR); Tae-Hyung Kim, Siheung-si (KR)

(73) Assignee: DAE WON SAN UP CO., LTD., Ansan-si, Gyeonggi-Do (KR)

(*) Notice: Subject to any disclaimer, the term of this patent is extended or adjusted under 35 U.S.C. 154(b) by 0 days.

(21) Appl. No.: 15/957,219

(22) Filed: Apr. 19, 2018

(65) Prior Publication Data

US 2018/0304791 A1 Oct. 25, 2018

(30) Foreign Application Priority Data

Apr. 20, 2017 (KR) .................. 10-2017-0050782

(51) Int. Cl.
  *B60N 3/06* (2006.01)
  *B60N 2/90* (2018.01)
  *F16H 19/04* (2006.01)
  *F16H 25/20* (2006.01)
  *B60N 2/02* (2006.01)

(52) U.S. Cl.
  CPC ............ *B60N 2/995* (2018.02); *F16H 19/04* (2013.01); *F16H 25/20* (2013.01); *B60N 2002/0236* (2013.01); *F16H 2025/209* (2013.01); *F16H 2025/2043* (2013.01)

(58) Field of Classification Search
  CPC .................................................. B60N 2/995

USPC ............ 297/423.2, 423.22, 423.23, 423.24, 297/423.26, 423.28, 423.3
See application file for complete search history.

(56) References Cited

U.S. PATENT DOCUMENTS

| 3,794,381 | A | * | 2/1974 | Caldemeyer | ........... A47C 7/506 297/423.22 |
| 5,352,020 | A | * | 10/1994 | Wade | ................. B64D 11/0643 297/423.26 |
| 5,507,562 | A | * | 4/1996 | Wieland | ................. A47C 7/506 297/423.2 |
| 6,095,610 | A | * | 8/2000 | Okajima | ................ B60N 2/995 297/423.2 X |

(Continued)

FOREIGN PATENT DOCUMENTS

JP 11332687 A * 12/1999 ............ B60N 2/995
KR 10-1998-0078367 A 11/1998
(Continued)

*Primary Examiner* — Rodney B White
(74) *Attorney, Agent, or Firm* — Novick, Kim & Lee, PLLC; Jae Youn Kim (57) ABSTRACT

Provided is a leg-rest for a vehicle which is switchable at the front lower end of a seat between a receiving position in which the leg-rest is folded on the seat and a deploying position in which the leg-rest is drawn out to support the calves of a passenger, the leg-rest including: a support panel of which the front end is rotatably connected to an extending slider which is folded at the receiving position and unfolded at the deploying position; a tilt link which is spaced apart from a connection point between the support panel and the extending slider so that one end thereof is rotatably connected to the support panel; a slider which is rotatably connected with the other end of the tilt link and tilts up or down the support panel when sliding; and a tilt motor which slides the slider.

5 Claims, 6 Drawing Sheets

(56) References Cited

U.S. PATENT DOCUMENTS

| | | | | |
|---|---|---|---|---|
| 6,170,786 B1* | 1/2001 | Park | ................ | B60N 2/0232 248/274.1 |
| 6,692,078 B2* | 2/2004 | Pham | ................ | A47C 1/0342 297/423.2 X |
| 7,229,134 B2* | 6/2007 | Ito | ................ | B60N 2/0232 297/423.26 |
| 7,325,878 B1* | 2/2008 | Dehli | ................ | A47C 7/506 297/423.2 |
| 8,870,289 B2* | 10/2014 | Yin | ................ | A47C 7/506 297/423.22 |
| 2001/0000639 A1* | 5/2001 | Park | ................ | A47C 1/0352 297/411.3 |
| 2001/0033101 A1* | 10/2001 | Plant | ................ | A47C 1/0352 297/342 |
| 2001/0048239 A1* | 12/2001 | Kogure | ................ | B60N 2/62 297/423.2 |
| 2005/0012377 A1* | 1/2005 | Ito | ................ | B60N 2/0232 297/423.26 |
| 2005/0173948 A1* | 8/2005 | Boehmer | ................ | B60N 2/995 297/69 |
| 2011/0298249 A1* | 12/2011 | Kuno | ................ | A47C 7/506 297/423.2 X |
| 2013/0045824 A1* | 2/2013 | Yin | ................ | A47C 7/506 474/148 |
| 2013/0045825 A1* | 2/2013 | Yin | ................ | A47C 7/506 474/150 |
| 2015/0021969 A1* | 1/2015 | Yin | ................ | B64D 11/0643 297/423.26 |
| 2016/0288673 A1* | 10/2016 | Vyskocil | ................ | B60N 2/995 |
| 2016/0339820 A1* | 11/2016 | Kajino | ................ | B60N 2/995 |
| 2017/0096225 A1* | 4/2017 | Smith | ................ | B60N 2/995 |
| 2019/0031353 A1* | 1/2019 | Texeraud | ................ | B64D 11/0643 |

FOREIGN PATENT DOCUMENTS

| | | |
|---|---|---|
| KR | 10-0710628 B1 | 4/2007 |
| KR | 10-2014-0055057 A | 5/2014 |
| KR | 10-2016-0005274 A | 1/2016 |
| KR | 10-1687532 B1 | 12/2016 |

* cited by examiner

LEG-REST FOR VEHICLE

CROSS-REFERENCE TO RELATED APPLICATION

This application claims under 35 U.S.C. § 119(a) the benefit of Korean Patent Application No. 10-2017-005082 filed on Apr. 20, 2017, the entire contents of which are incorporated herein by reference.

BACKGROUND

(a) Technical Field

The present invention relates to a leg-rest for a vehicle which is switchable between a receiving position and a deploying position, and more particularly, to a leg-rest for a vehicle in which a support panel is tilted-up at a predetermined angle at a deploying position to provide an optimal comfort to a passenger.

(b) Background Art

As the marketability of vehicles increases, additional installation of various convenience devices is increasing, and generally, a leg-rest installed on the front end of a passenger seat is installed as one of the convenience devices of the seat. The leg-rest for the vehicle is generally installed below a rear seat of the vehicle and supports a calf portion of a sitter when placing to provide a comfort.

In the leg-rest for the vehicle, a manual type of switching the leg-rest from a receiving position (where the support panel supporting the calves is folded) to a deploying position (where the support panel is unfolded to support the calves) by a user's hand and an automatic type of switching the leg-rest to the deploying position when a switch is pressed using a power unit. Manual and automatic leg-rests in the related art are commonly configured to be switched by a linking motion of a link device. The present applicant has also filed a leg-rest device for a vehicle with a more simplified structure (Korean Patent Application No. 10-2015-0171167, filed on Dec. 3, 2015). In order to improve the device, a structure of a leg-rest which is switched by one motor has been also filed (Korean Patent Application No. 10-2017-0016360, filed on Feb. 6, 2017).

The leg-rest in Korean Patent Application No. 10-2015-0171167 has a structure in which a leg frame rotates and rises at the same time according to a linking motion of a frame support, a connection support, and a slide support (as a trajectory difference caused by rotation of the connection support and the slide support and the rotation of the frame support occur at the same time) when the user moves the leg frame by a hand. The leg-rest in Korean Patent Application No. 10-2017-0016360 has a structure in which a pinion gear is mounted on a base slider, and when the pinion gear rotates, a rotary arm of the seat side and an extending slider (supporting the calves of the passenger) move at the same time and then the leg-rest is deployed by only one motor.

Meanwhile, it is known that lifting the legs at the time of sleep helps in blood circulation. For example, in the case of patients with poor blood circulation such as varicose veins, it is recommended to go to bed while the legs are lifted at bedtime. A passenger without a problem with blood circulation may also feel more comfortable with slightly lifted calves than a posture in which the hips and calves on the seat are placed in parallel.

That is, a leg-rest capable of lifting and supporting the calves of the passenger at a predetermined angle so that the passenger may feel more convenient and comfort has been required, but in a conventional structure, a function of lifting (tilting-up) and supporting the calves of the passenger is not provided.

SUMMARY OF THE DISCLOSURE

Therefore, an object of the present invention is to provide a leg-rest for a vehicle capable of additionally lifting and supporting the calves of a passenger at a deploying position according to the development demand.

In order to achieve the object described above, an exemplary embodiment of the present invention provides a leg-rest for a vehicle which is switchable at the front lower end of a seat between a receiving position in which the leg-rest is folded on the seat and a deploying position in which the leg-rest is drawn out to support the calves of a passenger, the leg-rest including: a support panel of which the front end is rotatably connected to an extending slider which is folded at the receiving position and unfolded at the deploying position; a tilt link which is spaced apart from a connection point between the support panel and the extending slider so that one end thereof is rotatably connected to the support panel; a slider which is rotatably connected with the other end of the tilt link and tilts up or down the support panel when sliding; and a tilt motor which slides the slide by applying power, in which the tilt motor slides the slider when the leg-rest is at the switching position to tilt up the support panel.

The leg-rest for the vehicle of the present invention may include a fixing bracket which is fixed to the seat; a rotary arm of which one end is rotatably connected to the fixing bracket; a base slider which is slidably coupled to the rotary arm in a longitudinal direction; an extending slider which is slidably coupled to the base slider in a longitudinal direction and coupled with the support panel; a rotary assist arm of which one end is spaced apart from the rotary arm to be rotatably connected to the fixed bracket and the other end is rotatably connected with the base slider; and a sliding device which slides the rotary arm and the extending slider in opposites direction to each other from the base slider, in which when the sliding device slides the rotary arm and the extending slider from the base slider in opposite directions to each other, the movement of the extending slider is performed so that the support panel is switched between the receiving position and the deploying position due to a difference in trajectory between the rotary arm and the rotary assist arm.

The sliding device may include a motor which is mounted on the base slider; a screw which is fixed to the extending slider and connected to the motor to be slidable; and a pinion gear which is rotatably mounted on the base slider, in which first gear holes engaging with the pinion gear are formed in the extending slider in a longitudinal direction, second gear hole engaging with the pinion gear are formed in the rotary arm in a longitudinal direction, and when the extending slider slides by the sliding of the screw, the rotary arm slides in an opposite direction to the extending slider together with the rotation of the pinion gear.

A rotation shaft of the motor may be connected with a worm wheel and the screw may have threads formed on the outer circumferential surface to receive the rotational force from the worm wheel to slide according to the rotation of the motor.

In one embodiment of the present invention, the support panel may be tilted up in an angle range of 10° to 40° (preferably an angle range of 15° to 25°). In addition, the tilt motor may rotate a tilt screw and the slider may be coupled with a sliding gear sliding according to the rotation of the tilt screw.

According to the present invention having the above configuration, since the calves of the passenger may be lifted and supported at a predetermined angle according to a selection of the passenger, it is possible to increase easement and comfort experienced by the passenger.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

DETAILED DESCRIPTION

The present invention will be described more fully hereinafter with reference to the accompanying drawings, in which exemplary embodiments of the invention are shown. However, the present invention can be realized in various different forms, and is not limited to the exemplary embodiments described herein.

In order to clearly describe the present invention, portions which are not related to the description will be omitted. Like reference numerals designate like or similar components throughout the specification.

Terms or words used in this specification and claims should not be interpreted as being limited to typical or dictionary meanings, but should be interpreted as having meanings and concepts which comply with the technical spirit of the present disclosure, based on the principle that an inventor can appropriately define the concept of the term to describe his/her own invention in the best manner.

Hereinafter, preferred exemplary embodiments of the present invention will be described in detail with reference to the accompanying drawings.

Figure 1:
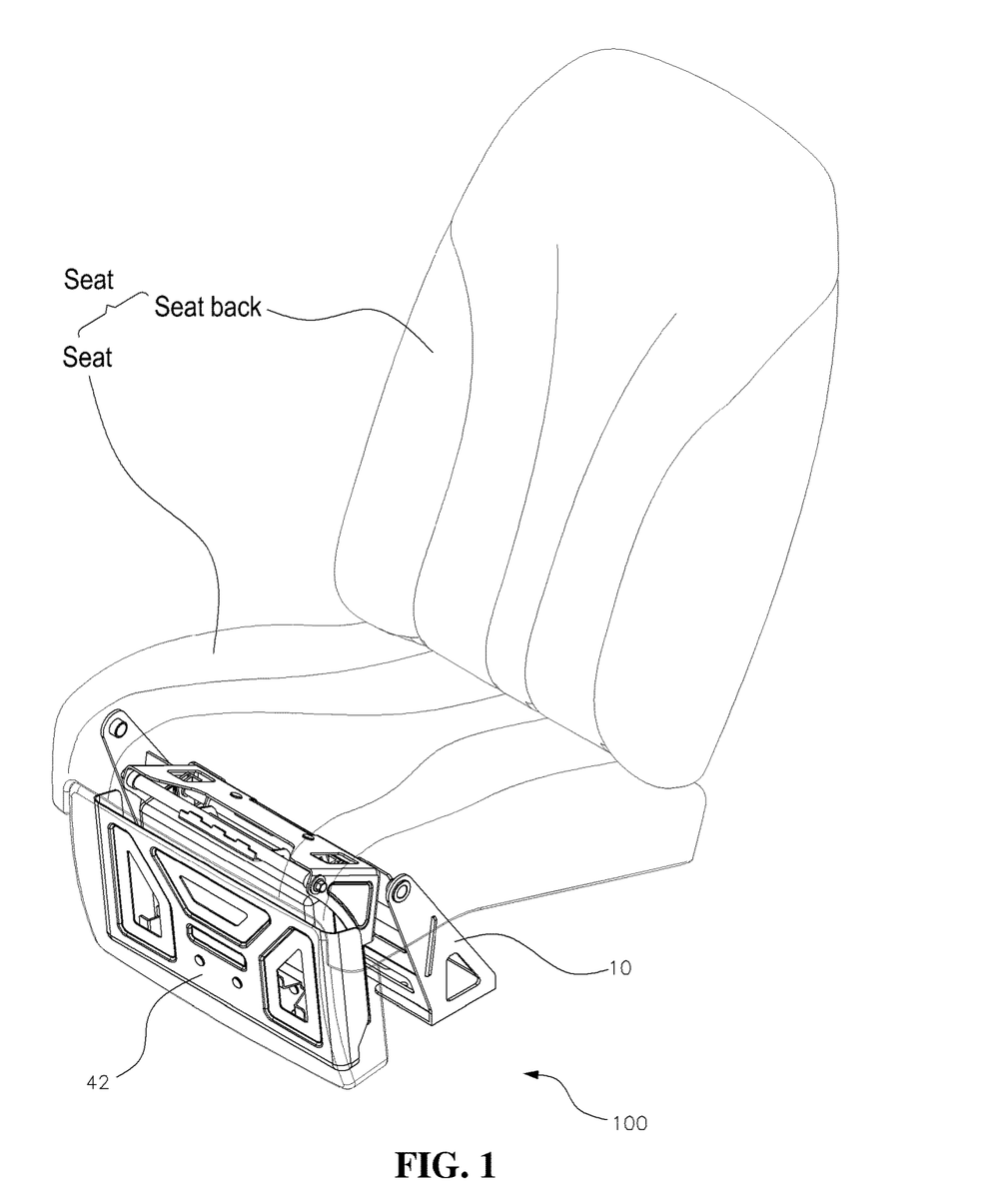
FIG. 1 is a diagram illustrating a state in which a leg-rest for a vehicle according to a preferred embodiment of the present invention is mounted on a seat.
Figure 2:
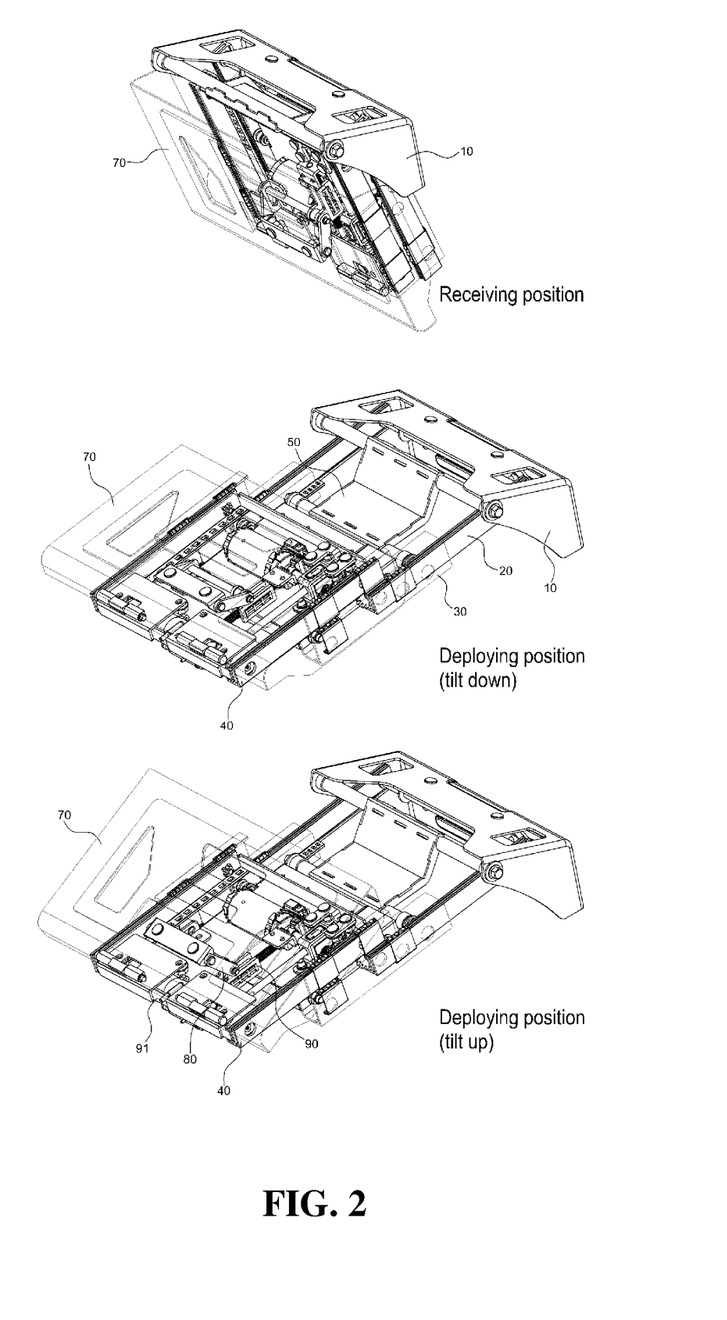
FIG. 2 is a diagram illustrating states when the leg-rest for the vehicle according to the preferred exemplary embodiment of the present invention is at a receiving position, tilted down at a deploying position, and tilted down at the deploying position.

As illustrated in FIG. 1, the present invention relates to a leg-rest 100 which is mounted on the front lower end of a vehicle seat constituted by a combination of a seat back and a seat. As illustrated in FIG. 2, the leg-rest 100 according to the present invention is switchable between a receiving position in which a support panel 70 is folded on the seat and a deploying position in which the support panel 70 is drawn out to support the legs of a seated person, and the support panel 70 may be additionally tilted up at the deploying position.

The tilt up structure according to the present invention can be applied even to the leg-rest which is switchable between the receiving position and the deploying position by another link movement or another principle, but is applied to the leg-rest operating according to a structure described in Korean Patent Application No. 10-2017-0016360 filed on Feb. 6, 2017 by the present applicant.

Figure 3:
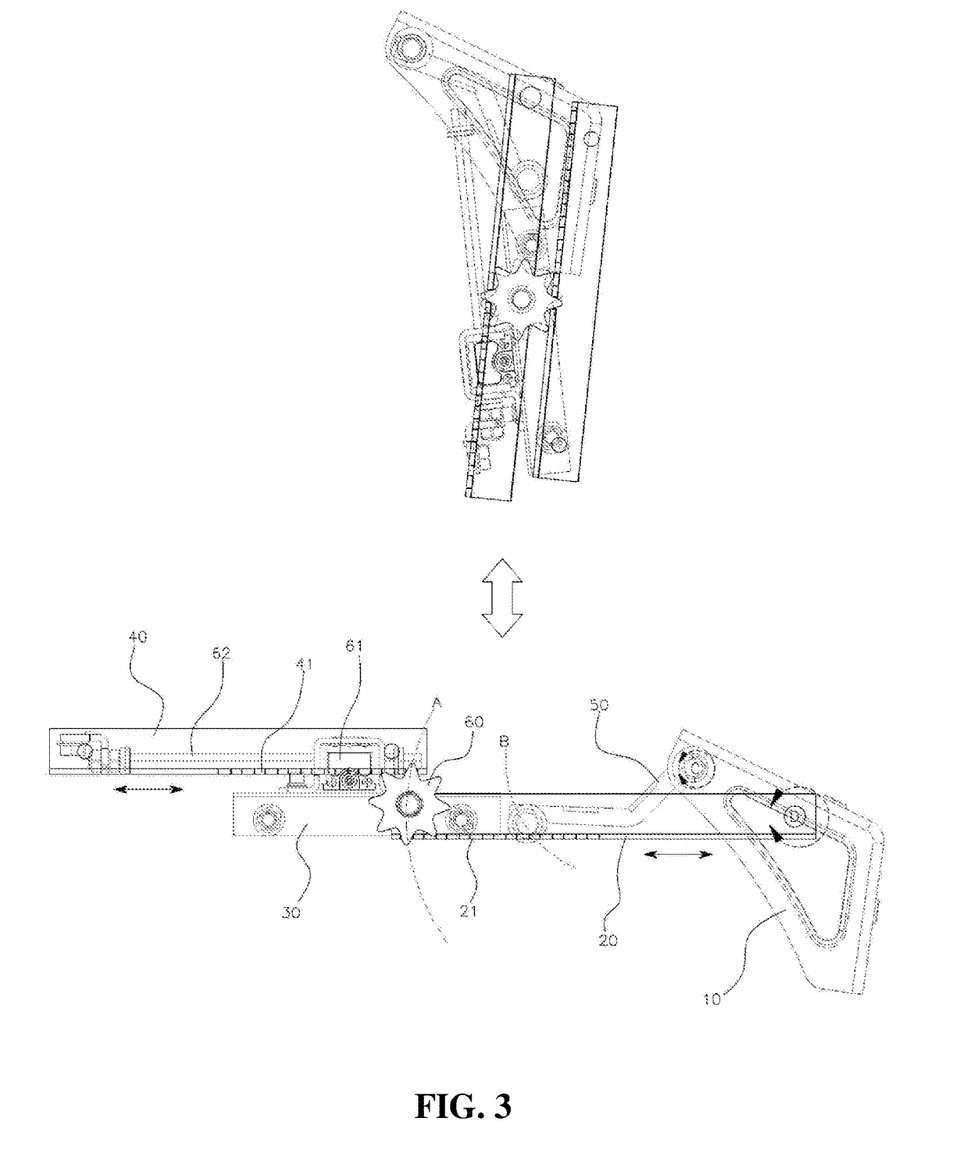
FIG. 3 is a diagram illustrating projected side states when the leg-rest is at the receiving position (the upper diagram) and at the deploying position (the lower diagram) while a support panel, a tilt link, a slider, and a tilt-up motor are removed (in order to avoid overlapping of lines in the drawing)

FIG. 3 illustrates projected side states in which the leg-rest 100 is at the receiving position and at the deploying position while the support panel 70, a tilt link 80, a slider 90, and a tilt motor 91 according to the present invention are removed so as to prevent lines from overlapping with each other. Referring to FIG. 3, the configuration of the leg-rest 100 includes a fixing bracket 10, a rotary arm 20, a base slider 30, an extending slider 40, a rotary assist arm 50, and a sliding device.

The fixing bracket 10 is made of a metallic material to be fixed to a metallic frame in the seat through bolting, welding, or the like, and one end of the rotary arm 20 is rotatably connected to the fixing bracket 10.

In addition, the other end of the rotary arm 20 is coupled to the base slider 30 and the base slider 30 is slidably connected in a longitudinal direction. The extending slider 40 is slidably coupled to the base slider 30 in a longitudinal direction and a support panel 70 (not shown in FIG. 3) for supporting the calves of a passenger is installed on the upper surface of the extending slider 40 to be rotatable at the front end. On the upper surface of the support panel 70, a soft cushion made of leather or artificial leather, synthetic leather, and the like which is the same as or similar to the seat is selectively mounted (see FIG. 6).

The rotary assist arm 50 is separated from the rotary arm 20 to be rotatably connected to the fixing bracket 10 and the other end thereof is rotatably connected to the base slider 30. That is, the rotary assist arm 50 connects the fixing bracket 10 and the base slider 30 separately from the rotary arm 20. A rotation shaft C of the rotary assist arm 50 is spaced apart from a rotation shaft D of the rotary arm 20, and lengths of the rotary arm 20 and the rotary assist arm 50 are different from each other, and thus, a trajectory B of the end of the rotary assist arm 50 is also different from a trajectory A of the end of the rotary arm.

Furthermore, in the present invention, the base slider 30 includes a sliding device for sliding the rotary arm 20 and the extending slider 40 in directions opposite to each other, and the sliding device includes a motor 61, a screw 62, and a pinion gear 60. The motor 61 is fixed to the base slider 30, and the screw 62 is mounted on the extending slider 40 and connected to the motor 61 to be slidable in a longitudinal direction according to the rotation of the motor 61.

In addition, the pinion gear 60 of which the rotation shaft is fixed to the base slider 30 is rotatable at the base slider 30. The pinion gear 60 is rotatable and reversible, and the upper end of the pinion gear 60 engages with first gear holes 41 (see FIG. 4) perforated in the extending slider 40 and the lower end of the pinion gear 60 engages with second gear holes 21 perforated in the rotary arm 20. A plurality of first gear holes 41 and second gear holes 21 are formed at predetermined intervals in the longitudinal direction in the extending slider 40 and the rotary arm 20, respectively, to engage with gear teeth of the pinion gear 60.

Further, the rotation shaft of the motor 61 is connected to a worm wheel (not shown) so as to slide the screw 62 while reducing the rotational force of the motor 61, and the screw 62 has a structure (see FIG. 4) having threads formed on the outer circumferential surface to receive the rotational force from the worm wheel. The configurations for decelerating the motor through the worm gear and sliding the screw are well known and will not be described in more detail.

Accordingly, when the motor 61 operates to slide the screw 62, the extending slider 40 slides together from the base slider 30 by sliding the screw 62 and the pinion gear 60 also rotates at the same time, and the rotary arm 10 also slides in an opposite direction to the extending slider 40 from the base slider 30. That is, when the motor 61 operates to slide the extending slider 40 to the left side based on the base slider 30 in FIG. 3, the pinion gear 60 rotates counterclockwise and the rotary arm 20 slides to the right side. In addition, when the extending slider 40 slides to the right side based on the base slider 30, the pinion gear 60 rotates clockwise and the rotary arm 20 slides to the left side.

Therefore, when the motor 61 extends the base slider 30 and the extending slider 40 from the rotary arm 20 (the base slider slides the rotary arm and the extending slider in opposite directions to each other) while the rotary arm 20 is fixed to the fixing bracket 10, the rotary arm 20, the base slider 30, and the extending slider 40 are rotated to be lifted simultaneously with the sliding due to a difference in trajectory between the rotary arm 20 and the rotary assist arm 50, and the support panel 42 mounted on the extending slider 40 moves to the deploying position. That is, when the force is applied to the rotary arm 20 in a direction far away from the base slider 30 while the rotation shaft C of the rotary assist arm 50 and the rotation shaft D of the rotary arm 20 are spaced apart from each other, a part of the force is switched into the force for rotating the end of the rotary assist arm 50 at the base slider 30. As a result, the rotary assist arm 50 and the rotary arm 20 are rotated in a lifting direction and simultaneously, the extending slider 40 slides from the base slider 30 to move to the deploying position.

Accordingly, the leg-rest 100 may be automatically switched between the deploying position and the receiving position when the seated person presses a switch that rotates and/or reverses the motor 61.

A support panel 70, a tilt link 80, a slider 90, and a tilt motor 91 according to the present invention are additionally mounted n the extending slider 40 of the leg-rest configured above.

The support panel 70 has a rectangular panel shape and the front end of the support panel 70 is rotatably connected to the extending slider 40 through a hinge or the like. In addition, the tilt link 80 has a bar shape having a predetermined length and is spaced apart from a connection point between the support panel 70 and the extending slider 70 so that one end of the tilt link 80 is rotatably connected to the support panel 40 through the bracket 81.

Figure 4:
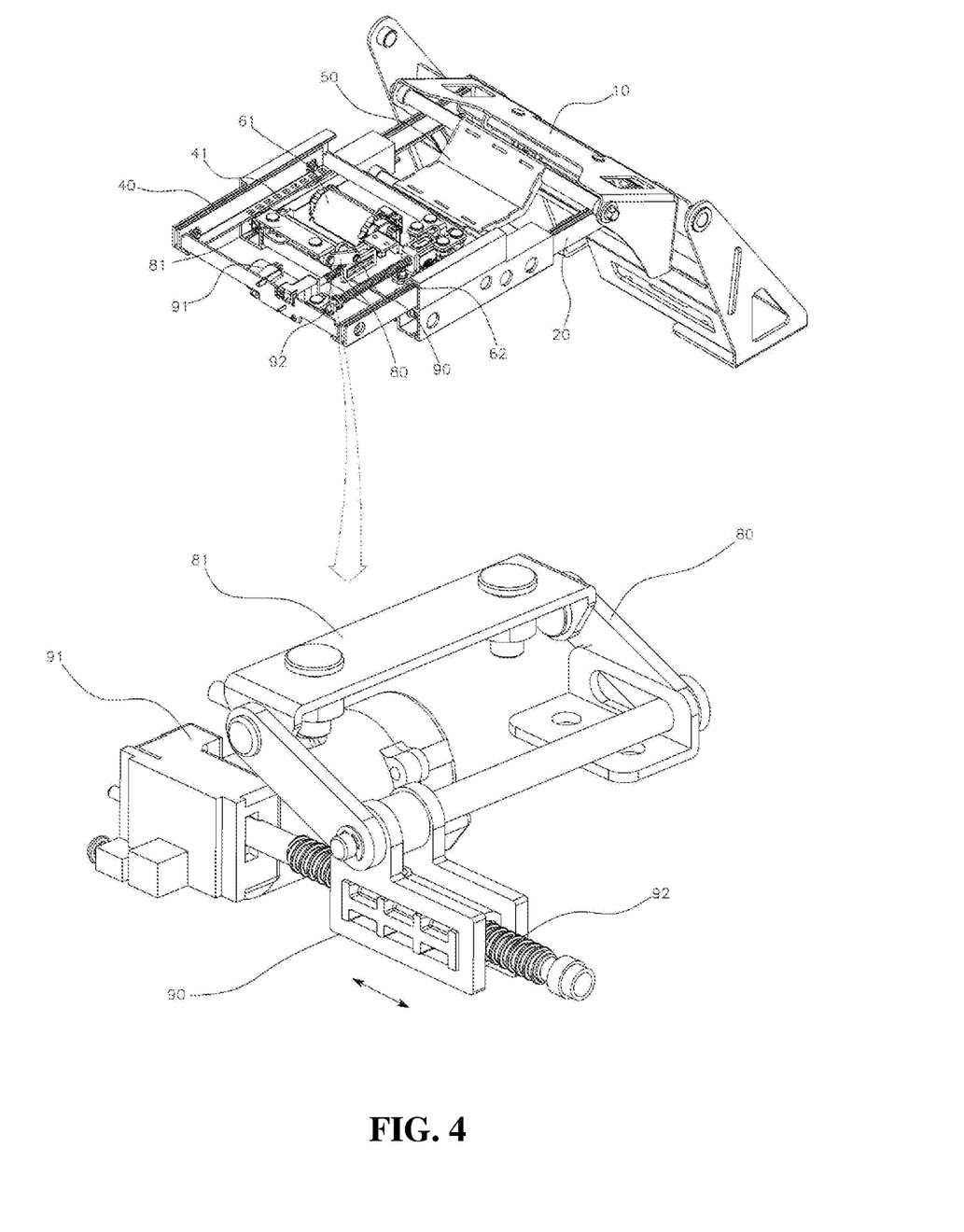
FIG. 4 is an enlarged view illustrating a state in which the tilt link, the slider, and the tilt-up motor are mounted while the support panel is removed.

The slider 90 is rotatably connected with the other end of the tilt link 80 and slidably mounted on the extending slider 40, and tilts up or down the support panel 70 according to the sliding position. In addition, as illustrated in FIG. 4, 4, a tilt screw 92 is mounted on the tilt motor 91, and a slide gear (not shown) that slides according to the rotation of the tilt screw 92 is coupled to the slider 90 and the slider 90 is slidable according to the rotation of the tilt screw 92.

Figure 5:
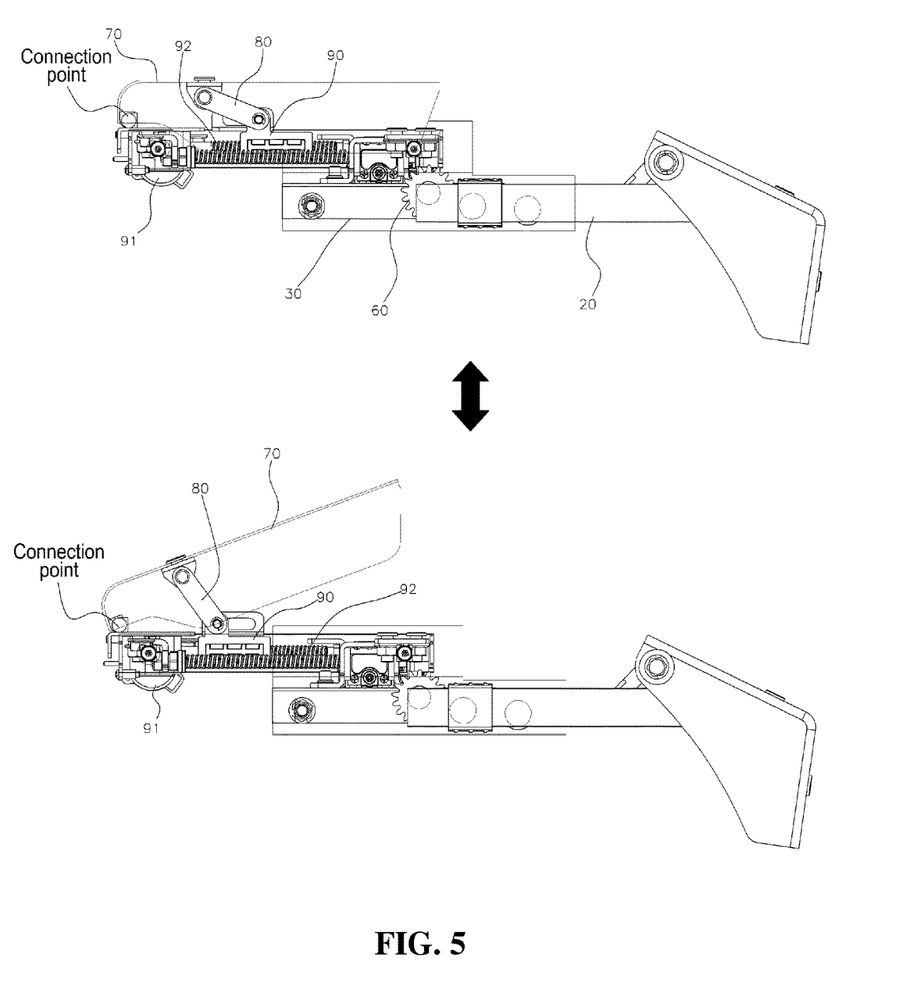
FIG. 5 is a diagram illustrating projected side states when the leg-rest is tilted down (the upper diagram) and is tilted up (the lower diagram)
Figure 6:
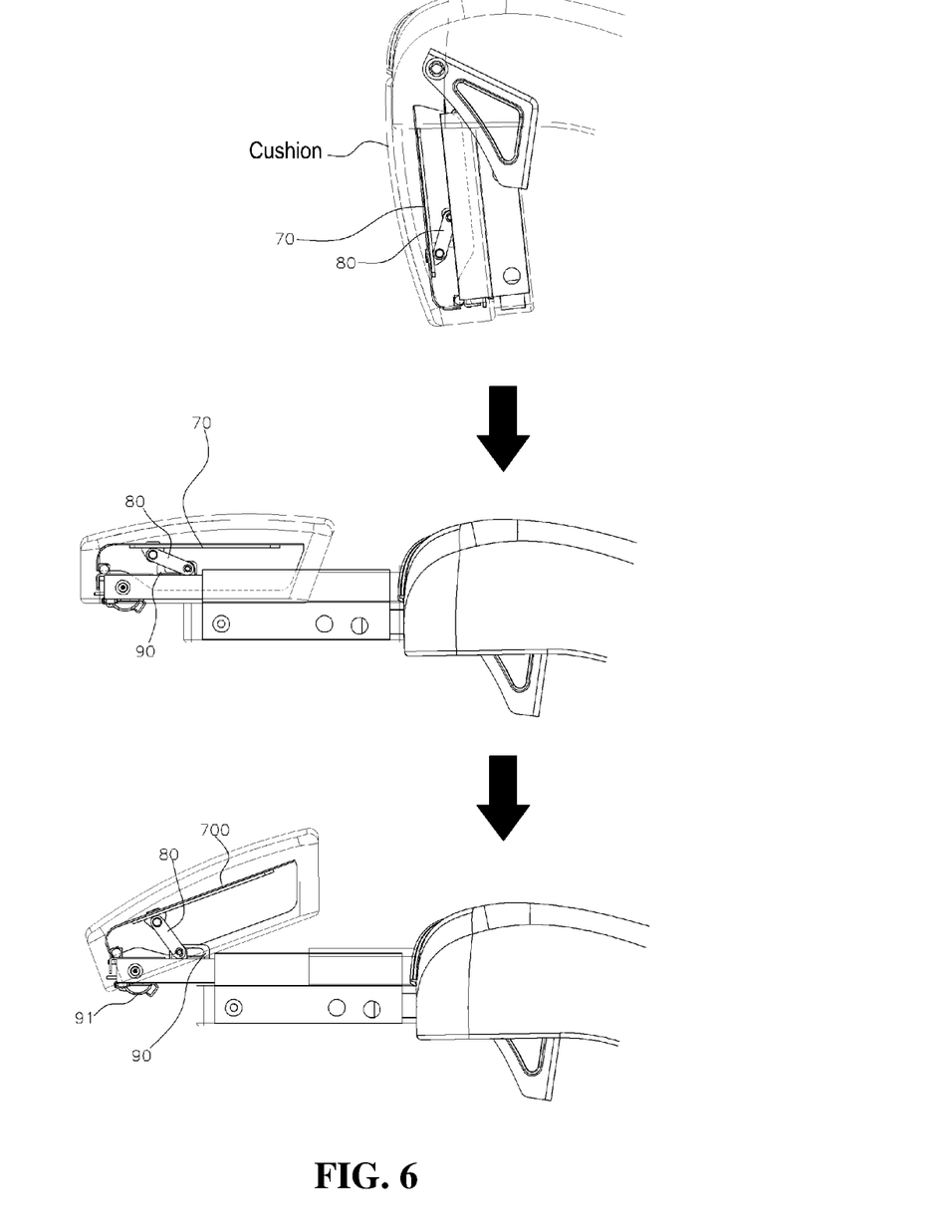
FIG. 6 is a diagram sequentially illustrating states in which the leg-rest for the vehicle is switched from the receiving position to the deploying position and then tilted up.

The rotation direction and the rotation amount of the tilt motor 91 are determined by a controller (not shown) for controlling the power of the leg-rest 100. In addition, the controller controls the tilt motor 100 and the motor 61 so as to tilt up the support panel 70 by applying the power to the tilt motor 91 only when the leg-rest 100 is at the switching position and tilt down the support panel 70 before the leg-rest 100 is switched to the receiving position, as illustrated in FIGS. 5 and 6.

Meanwhile, in the exemplary embodiment of the present invention, a range of the tilt-up angle of the support panel 70 is not limited, but may be generally set in a range of 15° to 30° for tilting up.

According to the present invention having the above configuration, since the calves of the passenger may be lifted and supported at a predetermined angle according to a selection of the passenger, it is possible to increase easement and comfort experienced by the passenger.

The aforementioned present invention is not limited to the aforementioned exemplary embodiments and the accompanying drawings, and it will be obvious to those skilled in the technical field to which the present invention pertains that various substitutions, modifications, and changes may be made within the scope without departing from the technical spirit of the present invention.

What is claimed is:

1. A leg-rest for a vehicle, which is switchable at a front lower end of a seat between a receiving position in which the leg-rest is folded on the seat and a deploying position in which the leg-rest is drawn out to support calves of a passenger, the leg-rest comprising:

a support panel including a front end rotatably connected to an extending slider which is folded at the receiving position and unfolded at the deploying position;

a tilt link which is spaced apart from a connection point between the support panel and the extending slider so that one end thereof is rotatably connected to the support panel;

a slider which is rotatably connected with another end of the tilt link and tilts up or down the support panel when sliding;

a tilt motor which slides the slider;

a fixing bracket which is fixed to the seat;

a rotary arm including one end rotatably connected to the fixing bracket;

a base slider which is slidably coupled to the rotary arm in a longitudinal direction, wherein the extending slider is slidably coupled to the base slider in the longitudinal direction and coupled with the support panel;

a rotary assist arm including one end spaced apart from the rotary arm to be rotatably connected to the fixing bracket and another end rotatably connected with the base slider; and a sliding device which slides the rotary arm and the extending slider in opposite directions to each other from the base slider, wherein when the sliding device slides the rotary arm and the extending slider from the base slider in opposite directions to each other, movement of the extending slider is performed so that the support panel is switched between the receiving position and the deploying position due to a difference in trajectory between the rotary arm and the rotary assist arm.

2. The leg-rest for the vehicle of claim 1, wherein the sliding device includes
- a motor which is mounted on the base slider;
- a screw which is fixed to the extending slider and connected to the motor to be slidable; and
- a pinion gear which is rotatably mounted on the base slider,
- wherein first gear holes engaging with the pinion gear are formed in the extending slider in the longitudinal direction, second gear holes engaging with the pinion gear are formed in the rotary arm in the longitudinal direction, and when the extending slider slides by sliding of the screw, the rotary arm slides in an opposite direction to the extending slider together with rotation of the pinion gear.

3. The leg-rest for the vehicle of claim 2, wherein a rotation shaft of the motor is connected with a worm wheel and the screw has threads formed on an outer circumferential surface to receive rotational force from the worm wheel to slide according to rotation of the motor.

4. The leg-rest for the vehicle of claim 1, wherein the support panel is tilted up in an angle range of 10° to 40°.

5. The leg-rest for the vehicle of claim 1, wherein the tilt motor rotates a tilt screw and the slider is coupled with a sliding gear sliding according to rotation of the tilt screw.

* * * * *